US012785431B2

(12) United States Patent
Lim et al.

(10) Patent No.: US 12,785,431 B2
(45) Date of Patent: Nov. 3, 2026

(54) SEAMLESS SWAPPING OF CHARGER FORWARD AND REVERSE MODES

(71) Applicant: Renesas Electronics America Inc., Milpitas, CA (US)

(72) Inventors: Sungkeun Lim, Apex, NC (US); Chong Han, Durham, NC (US); Phillip Marc Johnson, Durham, NC (US)

(73) Assignee: Renesas Electronics America Inc., San Jose, CA (US)

( * ) Notice: Subject to any disclaimer, the term of this patent is extended or adjusted under 35 U.S.C. 154(b) by 71 days.

(21) Appl. No.: 18/931,700

(22) Filed: Oct. 30, 2024

(65) Prior Publication Data

US 2026/0121435 A1 Apr. 30, 2026

(51) Int. Cl.

*H02J 7/02* (2016.01)
*H02J 7/00* (2006.01)
*H02J 7/90* (2026.01)

(52) U.S. Cl.

CPC ............. *H02J 7/865* (2026.01); *H02J 7/855* (2026.01); *H02J 7/933* (2026.01)

(58) Field of Classification Search

CPC ............. H02J 7/865; H02J 7/855; H02J 7/933
See application file for complete search history.

(56) References Cited

U.S. PATENT DOCUMENTS

2019/0173307 A1* 6/2019 Zhao ...................... H02J 7/865

* cited by examiner

*Primary Examiner* — Rexford N Barnie
*Assistant Examiner* — Terrence R Willoughby
(74) *Attorney, Agent, or Firm* — SCULLY, SCOTT, MURPHY & PRESSER, P.C.

(57) ABSTRACT

Systems and methods for operating a battery charger are described. A controller can operate a battery charger under a forward mode. Under the forward mode, a power supply is connected to the battery charger to provide power to a load and to charge a battery. The controller can determine an anticipation of removal of the power supply. In response to determining the anticipation, the controller can enable a reverse mode of the battery charger. When the reverse mode is enabled, the power supply remains connected to the battery charger to provide power to the load and charging of the battery is suspended. The controller can further determine at least one configuration of the reverse mode of the battery charger.

14 Claims, 8 Drawing Sheets

500

700

SEAMLESS SWAPPING OF CHARGER FORWARD AND REVERSE MODES

BACKGROUND

The present disclosure relates in general to semiconductor devices. More specifically, the present disclosure relates to seamless swapping operation of a battery charger between a reverse mode and a forward mode, specifically, operating the battery charger in reverse mode in anticipation of an adapter removal.

A device that includes a battery and an internal battery charger can be connected to power adapters that provide power from a power source external to the device. When the power adapter is connected to the device, the battery charger operates under a forward mode where the power being provided from the power source can be used for charging the battery and can also be provided to at least one load in the device. When the power adapter is disconnected from the device, the battery charger operates under an on-the-go (OTG) mode, or reverse mode, where the battery provides power to the at least one load in the device.

SUMMARY

In one embodiment, a method for operating a battery charger is generally described. The method can include operating a battery charger under a forward mode. Under the forward mode, a power supply is connected to the battery charger to provide power to a load and to charge a battery. The method can further include determining an anticipation of removal of the power supply. The method can further include, in response to determining the anticipation, enabling a reverse mode of the battery charger, wherein when the reverse mode is enabled, the power supply remains connected to the battery charger to provide power to the load and charging of the battery is suspended and determining at least one configuration of the reverse mode of the battery charger.

In one embodiment, an apparatus for operating a battery charger is generally described. The apparatus can include a plurality of switches and a controller. The controller can be configured to control the plurality of switches to operate a battery charger under a forward mode. Under the forward mode, a power supply is connected to the battery charger to provide power to a load and to charge a battery. The controller can be further configured to determine an anticipation of removal of the power supply. The controller can be further configured to, in response to determination of the anticipation, enable a reverse mode of the battery charger. When the reverse mode is enabled, the power supply remains connected to the battery charger to provide power to the load and charging of the battery is suspended. The controller can be further configured to determine at least one configuration of the reverse mode of the battery charger.

In one embodiment, a system implementing battery charging is generally described. The system can include a battery, a load, and a battery charger. The battery charger can be configured to operate in a forward mode to allow a power supply to provide power to the load and to charge the battery. Under the forward mode, the power supply is connected to the battery charger. The battery charger is further configured to determine an anticipation of removal of the power supply. The battery charger is further configured to, in response to determination of the anticipation, enable a reverse mode of the battery charger. When the reverse mode is enabled, the power supply remains connected to the battery charger to provide power to the load and charging of the battery is suspended. The battery charger is further configured to determine at least one configuration of the reverse mode of the battery charger.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, to provide an understanding of the various embodiments of the present application. However, it will be appreciated by one of ordinary skill in the art that the various embodiments of the present application may be practiced without these specific details. In other instances, well-known structures or processing steps have not been described in detail to avoid obscuring the present application.

Figure 1:
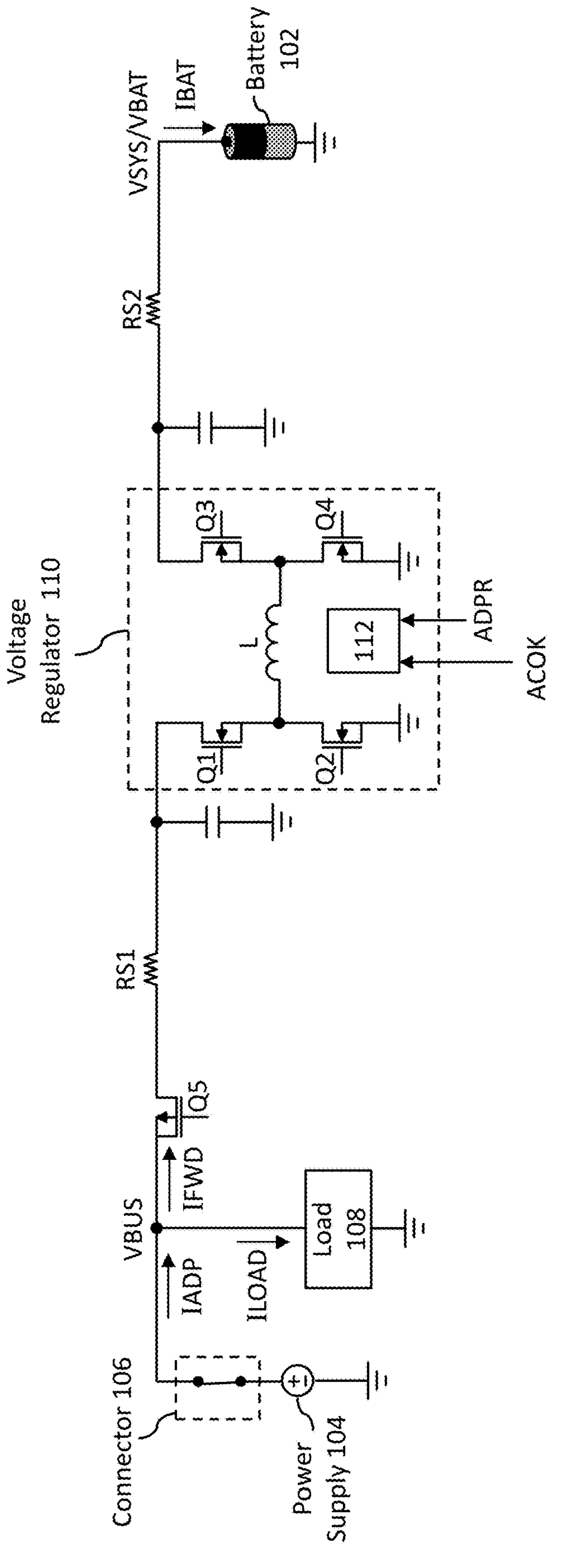
FIG. 1 is a diagram showing a forward mode operation of a system that can implement seamless swapping of charger forward and reverse modes in one embodiment.

FIG. 1 is a diagram showing a forward mode operation of a system that can implement seamless swapping of charger forward and reverse modes in one embodiment. A system 100 shown in FIG. 1 can be a battery charging system inside a device, such as a desktop computer, laptop computer, tablet device, cellular phone including smartphone, wearable device, a robot, or other devices that includes an internal battery pack (or battery), battery charger, and at least one load different from the battery pack. System 100 can include at least a connector 106, at least one load 108, a voltage regulator 110 and a battery 102. In one embodiment, voltage regulator 110 can implement a battery charger. In one embodiment, connector 106 can be a port of the device implementing system 100 for receiving power from an external power supply 104. In one or more embodiments, connector 106 can be various types of universal serial bus (USB) ports. Load 108 can be a load in system 100 that requires power to operate. For example, if system 100 is implemented in a computing device, load 108 can be a central processing unit (CPU), a microprocessor, a microcontroller, a network card, a graphics card, a memory controller, a wireless communication device, or other types of circuitry and electronic components that require power to operate. Battery 102 can be a battery pack including at least one battery.

Voltage regulator 110 can include a controller 112, an inductor L and a switching circuit including switches Q1, Q2, Q3, Q4. Switches Q1, Q2, Q3, Q4 can be metal-oxide-semiconductor field-effect transistors (MOSFET). Switches Q1, Q2, Q3, Q4 are arranged in a full-bridge configuration. Voltage regulator 110 can be a bi-directional switching converter configured to convert or regulate a voltage VBUS into a system or battery voltage VSYS or VBAT in a forward direction (e.g., from connector 106 to battery 102) and to convert or regulate VBAT into VBUS in a reverse direction (e.g., from battery 102 to connector 106). The voltage VBUS can be a voltage at a node between load 108 and voltage regulator 110.

Controller 112 can be, for example, a microcontroller, an analog controller, or dedicated analog hardware. Controller 112 can further include various electronic components, such as processors, logic circuits, digital to analog converters (DACs), comparators, mixers, amplifiers, and various electronic components. Controller 112 can also include memory devices, such as registers, configured to store various pre-defined reference and threshold values that may be needed for operating system 100. Controller 112 can be configured to generate control signals for controlling various aspects of system 100. For example, controller 112 can be configured to control switches Q1, Q2, Q3, Q4 based on various control loops, such as voltage control loops and current control loops. By way of example, controller 112 can monitor VBUS and regulate VBUS at a target voltage level.

In one or more embodiments, controller 112 can be configured to operate system 100 in a forward mode and a reverse or on-the-go (OTG) mode. Operation of the forward mode is shown in FIG. 1 and reverse mode will be described in more detail below. Controller 112 can receive an adapter connect power signal ACOK that indicates whether voltage is detected at connector 106 when system 100 operates in forward mode. When power supply 104 is connected to system 100, such as when connector 106 is closed or activated, and when power supply 104 provides adapter power via the connected connector 106, ACOK can be asserted (e.g., logic high). When ACOK is asserted, controller 112 can control switches Q1, Q2, Q3, Q4 to operate system 100 in forward mode. As shown in FIG. 1, under forward mode, a current IADP can flow from the connected power supply 104 and be distributed to load 108 as current ILOAD and to battery 102 as current IBAT. Hence, in forward mode, power supply 104 can support both VBUS for load 108 and VBAT for battery 102.

Figure 2:
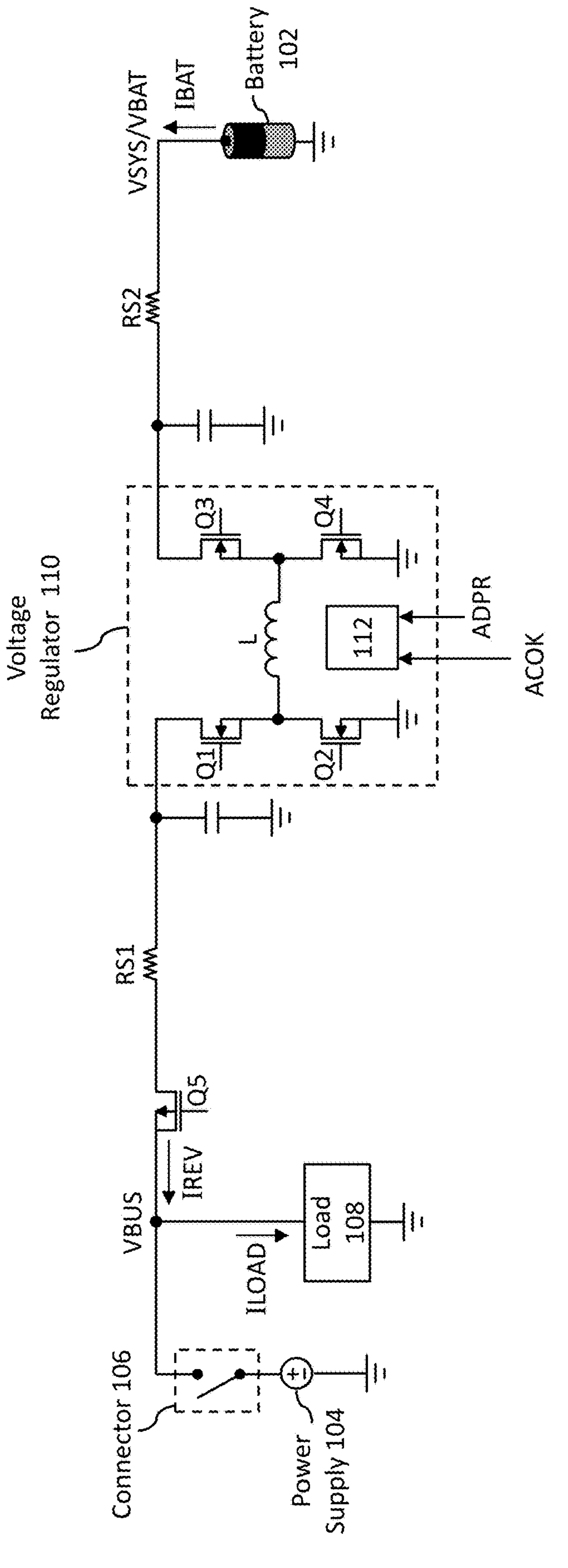
FIG. 2 is a diagram showing a reverse mode operation of the system in FIG. 1 that can implement seamless swapping of charger forward and reverse modes in one embodiment.

When adapter power is not detected at connector 106, ACOK can be de-asserted (e.g., logic low) and controller 112 can control switches Q1, Q2, Q3, Q4 to operate system 100 in reverse mode or OTG mode. In an aspect, ACOK can be de-asserted when connector 106 is opened (e.g., due to power supply 104 being disconnected). Also, in some aspects, after connector 106 is opened, adapter power can remain at connector 106 for a relatively short period of time such that ACOK signal may be de-asserted shortly after connector 106 is opened. As shown in FIG. 2, under reverse mode, power supply 104 no longer provides IADP and the current IBAT can flow from battery 102 towards load 108 as reverse current IREV. Hence, in reverse mode, battery 102 can support VBUS for load 108.

In an aspect, when power supply 104 is disconnected from system 100 during forward mode, forward mode can be disabled and IADP will stop supporting load 108. VBUS can drop to a lower level, or even down to zero, until controller 112 activates reverse mode to allow VBAT to support VBUS. However, various delays can occur between the time in which power supply is disconnected and the time when reverse mode is activated. These delays can cause VBUS to remain relatively low and at times, at zero volts, for an undesired amount of time and load 108 cannot operate normally without power during these delays. One of the delays can be an OTG startup debounce, or a startup time for reverse mode, which can be pre-programmed to a fixed time value that may be a shortest available startup delay (e.g., 7.5 milliseconds (ms)). Another delay can be a delay that occurs from the time VBUS voltage goes to zero until ACOK de-assertion occurs, which can be variable and can be approximately 26 ms in some systems. Further, even with reverse mode activated, another delay can occur from the reverse mode activation to the time when controller 112 starts switching Q1, Q2, Q3, Q4 to convert IBAT into IREV, and this delay can be approximately 8 ms in some systems. In some aspects, after power supply 104 is disconnected, capacitors connected to the drain terminals of Q1 and Q3 (not shown) can be discharged prior to activation of reverse mode to support VBUS. However, the charges stored in these capacitors can be limited and can be insufficient to support VBUS for the entire duration of the delays.

Figure 3:
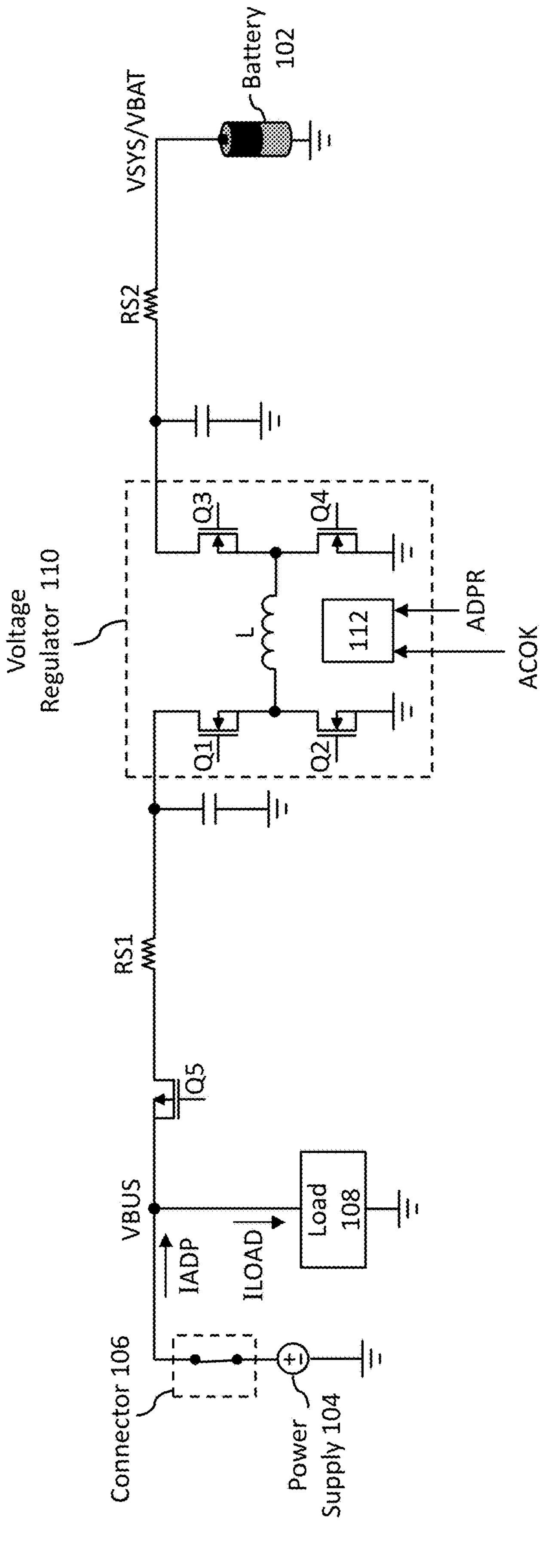
FIG. 3 is a diagram showing an operation of the system in FIG. 1 where reverse mode is enabled in anticipation of adapter removal in one embodiment.

In order to reduce or eliminate the down time of VBUS (e.g., lowered VBUS or zero volt), controller 112 can be configured to enable reverse mode while power supply 104 remains connected and connector 106 remains closed as shown in FIG. 3. Enabling reverse mode while power supply 104 remains connected can cause IADP to continue supporting VBUS and IADP can be provided as ILOAD to supply load 108. Further, enabling reverse mode while power supply 104 remains connected includes preventing IADP from flowing towards battery 102, such as by suspending charging of battery 102. In one embodiment, controller 112 can turn off switches Q1, Q3, or stop switching Q1, Q2, Q3, Q4, to prevent IADP from flowing to battery 102. Also, under the enabled reverse mode shown in FIG. 3, controller 112 can configure various settings of the reverse mode of system 100, such as setting a voltage VOTG of the reverse mode to a specific value and disabling over voltage protection under reverse mode. The configuration of the reverse mode settings can allow controller 112 to be ready for switching of Q1, Q2, Q3, Q4 in reverse mode. In one or more embodiments, system 100 can implement various hardware and/or software mechanisms to anticipate removal of power supply 104 from system 100. Based on the anticipation, controller 112 can be configured to enable reverse mode prior to the actual removal of power supply 104. Note that enabling reverse mode can be different from operating in reverse mode. Enabling reverse mode can include suspending charging of battery 102 and determining configurations of the reverse mode while power supply 104 remains connected and supports VBUS, whereas operating in reverse mode can include actually switching Q1, Q2, Q3, Q4 to allow battery 102 to support VBUS while power supply 104 is disconnected.

In one embodiment, an adapter removal signal ADPR encoding and/or indicating at least one parameter value can be received by controller 112. Controller 112 can use the parameter values encoded in the ADPR signal to determine whether removal of power supply 104 is anticipated, and anticipation of the power supply 104 being removed can trigger controller 112 to enable reverse mode before the actual removal of power supply 104. Descriptions of the parameter values that can be encoded in the ADPR signal will be described in more detail below. Since reverse mode was enabled before removal of power supply 104, and reverse mode configuration allows controller 112 to be ready to perform switching under reverse mode, controller 112 can switch without delay from operating system 100 in forward mode to reverse mode once power supply 104 is removed, without a need to determine the reverse mode configuration after power supply 104 is removed.

Figure 4:
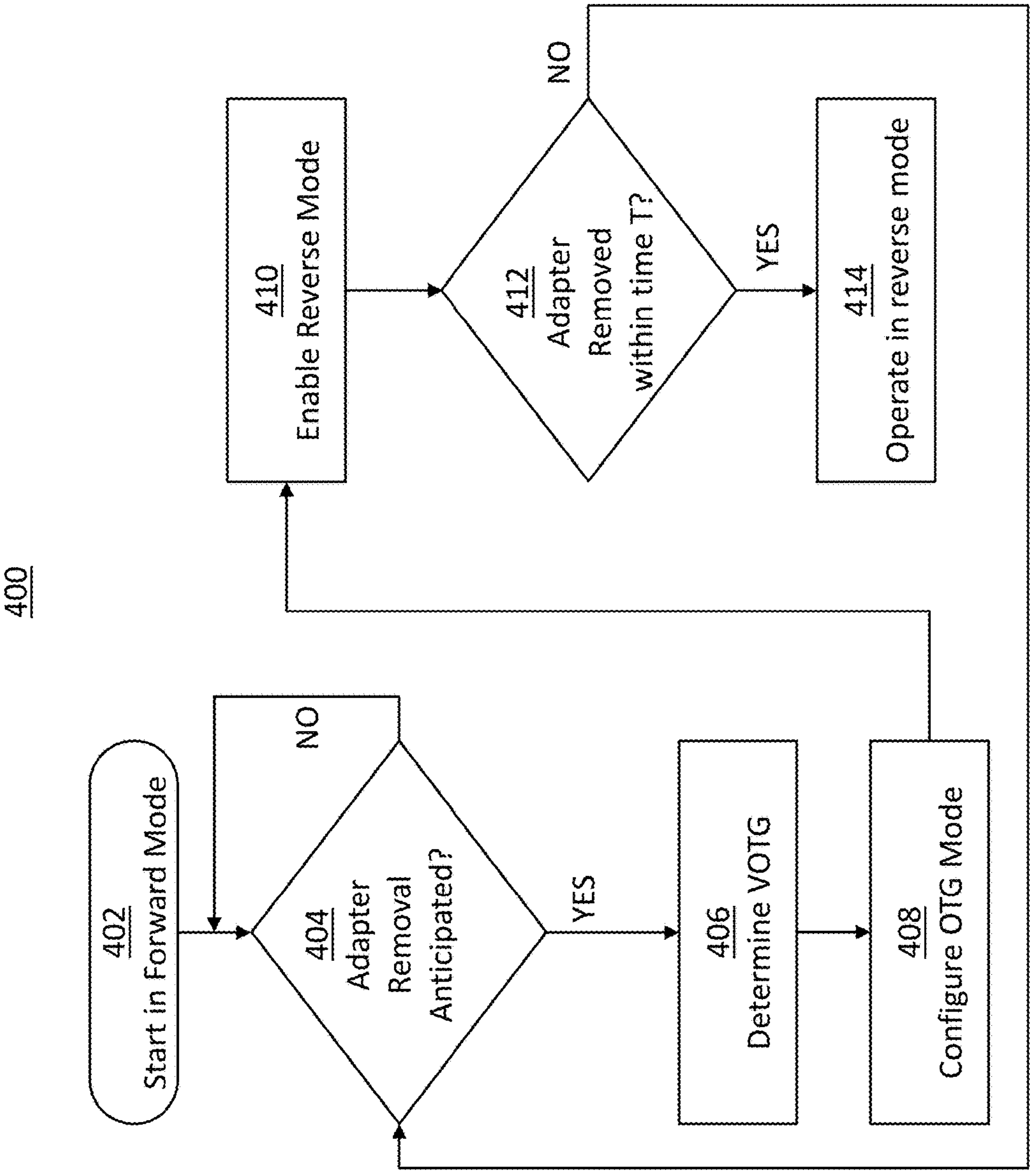
FIG. 4 is a flowchart of an example process that relates to implementation of a transition from forward mode to reverse mode in one embodiment.

FIG. 4 is a flowchart of an example process that relates to implementation of a transition from forward mode to reverse mode in one embodiment. Descriptions of FIG. 4 can reference components shown in FIG. 1 to FIG. 3. A process 400 shown in FIG. 4 can be performed by controller 112 of system 100. A starting block 402 of process 400 can occur when system 100 is operating in forward mode, where power supply 104 supports both VBUS and VBAT. Block 404 can be performed periodically to check whether an adapter removal is anticipated. The adapter can be, for example, connector 106 shown in FIG. 1 to FIG. 3. Also, in the present disclosure, adapter removal can be referring to disconnecting or removing power supply 104 from system 100. Various hardware and/or software implementations can be used for monitoring specific parameters or signals related to power supply 104 in order to detect whether the adapter removal is anticipated in block 404. Further, in some aspects, a duration from a start of the adapter removal and completion of the adaptor removal may provide ample time for controller 112 to anticipate a complete adapter removal. For example, controller 112 can detect a start of the adapter removal and anticipate that the adapter can be completely removed in, for example, a duration in the millisecond (ms) scale. If controller 112 does not anticipate adapter removal (404: NO), process 400 can remain at block 404 to continuously determine whether the adapter removal is anticipated. If controller 112 determines an anticipation of adapter removal (404: YES), process 400 can procced to block 406.

In one embodiment, input voltage and/or current (e.g., IADP) from power supply 104 can be continuously monitored by controller 112. If a relatively significant drop occurs in the input voltage and/or current, then the ADPR signal can be asserted and controller 112 can determine an anticipation of adapter removal based on the assertion of the ADPR signal. In another embodiment, power supply 104 can be configured to communicate with controller 112 using communication protocols such as USB Power Delivery (USB-PD). Power supply 104 can communicate information such as changes in the status of power supply 104, or request for a change in power levels, and based on these information (which may be encoded in the ADPR signal), controller 112 can determine an anticipation of adapter removal. In another embodiment, connector 106 can be a barrel adapter and system 100 can include a mechanical switch for detecting whether the barrel adapter is being removed. A start of the barrel adapter removal may release the mechanical switch and assert the ADPR signal, and based on assertion of the ADPR signal, controller 112 can detect the release and anticipate that the barrel adapter will soon be completely removed. In another embodiment, system 100 can include detection circuits formed by various sensors for sensing whether a removal of the adapter has begun. The ADPR signal can encode sensor data of the sensors and controller 112 can use the sensor data encoded in ADPR signal to determine an anticipation of adapter removal. In another embodiment, when the battery 102 is fully charged, the ADPR signal can be asserted and controller 112 can anticipate adapter removal since a user may disconnect the adapter when battery 102 is fully charged. In another embodiment, if a temperature of the adapter is increased past a predetermined temperature threshold, such as a temperature that causes suspension of charging battery 102, the ADPR signal can be asserted and controller 112 can anticipate adapter removal since a user may disconnect the adapter when charging is suspended and temperature is indicated as being too high. In another embodiment, system 100 may be part of a robot and power supply 104 may be part of a docking station, and the robot may assert the ADPR signal in anticipation of leaving the docking station.

At block 406, controller 112 can determine a value of a reverse mode voltage or OTG mode voltage VOTG. In one embodiment, controller 112 can set VOTG to be less than a supply voltage, such as voltage of the adapter or voltage of the power being provided by power supply 104, or a voltage measured or sensed by various mechanisms in system 100. In one embodiment, a memory device of controller 112 (e.g., a register) can store a predetermined value of VOTG and controller 112 can load the predetermined VOTG in block 406. By way of example, the predetermined value of VOTG can be a minimum voltage necessary to support load 108. In another embodiment, a memory device of controller 112 (e.g., a register) can store a predetermined offset and controller 112 can determine VOTG by subtracting the predetermined offset from the supply voltage. By way of example, if the predetermined offset is 4 volts (V), and the supply voltage is 48V, then controller 112 can determine that VOTG is 44V (e.g., 48V−4V=44V). In another embodiment, system 100 can be a USB C-type power delivery (USB-C PD) system and there can be a query negotiated value for the voltage VBUS. Controller 112 can determine VOTG by subtracting the predetermined offset from the negotiated VBUS. By way of example, if the predetermined offset is 4 volts (V), and the negotiated VBUS is 36V, then controller 112 can determine that VOTG is 32V (e.g., 36V−4V=32V).

In one embodiment, process 400 can proceed from block 406 to block 408. In another embodiment, block 406 can be part of block 408. At block 408, controller 112 can configure the reverse mode or OTG mode of system 100. When block 406 is part of block 408, configuration of the reverse mode can include the determination of VOTG at block 406. The configuration in block 408 can include one or more of disabling an over voltage protection function of the reverse mode or OTG mode, determining VOTG, or other configurations for operating system 100 in reverse mode. By way of example, over voltage protection of the reverse mode may generate a fault if VBUS exceeds VOTG that was determined in block 406 and reverse mode cannot be enabled if a fault is present. Therefore, in one embodiment, in order to enable reverse mode as shown in FIG. 3, the over voltage protection of the reverse mode needs to be turned off since VOTG is determined to be less than the supply voltage at block 406. Under the reverse mode in FIG. 3, power supply 104 continues to support VBUS with its supply voltage, hence disabling the reverse mode over voltage protection can allow power supply 104 to support VBUS without interruption in response to enabling reverse mode.

Process 400 can proceed from block 408 to block 410. At block 410, controller 112 can complete the enablement of reverse mode shown in FIG. 3. In one embodiment, blocks

406 and 408 can be a part of block 410 such that enabling reverse mode includes determining the reverse mode configurations. In one embodiment, to enable reverse mode in block 410, controller 112 can disable forward mode by suspending regulation of VBUS or VBAT. In another embodiment, controller 112 can turn off switches Q1, Q3 to disable forward mode. When forward mode is disabled, controller 112 can enable reverse mode. When reverse mode is enabled, power supply 104 can continue to support VBUS while IADP does not flow towards battery 102 and charging of battery 102 is suspended. Also, when reverse mode is enabled, since VOTG is already determined in block 406 and various configurations are already performed in block 408, controller 112 can be ready to start switching Q1, Q2, Q3, Q4 to achieve VOTG once power supply 104 is disconnected.

Process 400 can proceed from block 410 to block 412. At block 412, controller 112 activates a timer that lapses after a predetermined amount of time T, where T is programmable. Controller 112 can wait until power supply 104 is disconnected (e.g., ACOK low) or wait for the lapse of the timer. If power supply 104 remains connected (e.g., ACOK high) after the timer lapsed or expired (412: NO), then process 400 can return to block 404 to operate system 100 in forward mode again and wait for another signal that may indicate anticipation of adapter removal. The timer can prevent system 100 from enabling reverse mode for an undesired amount of time. By way of example, enabling reverse mode can prevent battery 102 from being charged, thus the reverse mode being enabled for too long may cause battery 102 to remain uncharged for an undesired amount of time. Also, the signals being detected at block 404 for anticipating adapter removal can be false positives. By way of example, controller 112 can determine that power supply 104 may be removed when battery 102 is fully charged and proceed to perform blocks 406, 408, 410. If power supply 104 remains connected after block 410 for a relatively long period of time, then controller 112 needs a trigger to resume normal operations (e.g., forward mode). Thus, the wait for the predetermined amount of time T can provide a trigger for controller 112 to resume normal operations if the adapter anticipation at block 404 was a false positive.

If power supply 104 is disconnected before the predetermined amount of time T expires (412: YES), then process 400 can proceed to block 414, where controller 112 can operate system 100 in reverse mode or OTG mode by switching Q1, Q2, Q3, Q4 based on the configurations at block 408 to supply VBUS using the VOTG determined at block 406. In one embodiment, at block 414, controller 112 can enable over voltage protection to prevent VBUS from exceeding VOTG determined at block 406. As a result of performing process 400, the voltage VBUS may be maintained at a minimum voltage, e.g., VOTG, during a transition from forward mode to reverse mode and power to load 108 can remain uninterrupted.

Figure 5:
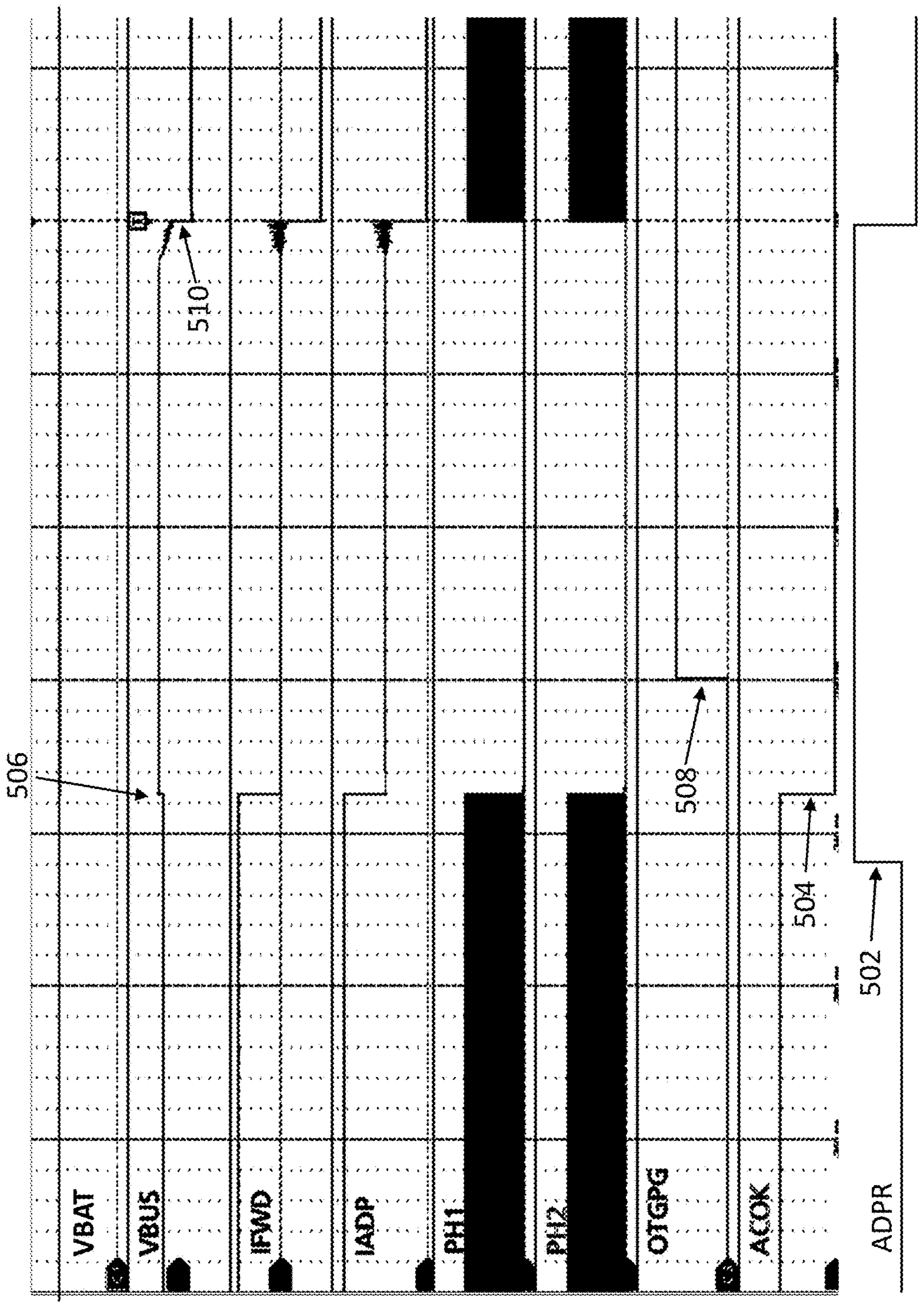
FIG. 5 is a diagram showing waveforms of signals resulting from the implementation of the example process of FIG. 4 in one embodiment.

FIG. 5 is a diagram showing waveforms of signals resulting from the implementation of the example process of FIG. 4 in one embodiment. Descriptions of FIG. 5 can reference components shown in FIG. 1 to FIG. 4. A plurality of signal waveforms 500 are shown in FIG. 5. Prior to a signal event 502, system 100 can be operating in forward mode (e.g., block 402, 404 of process 400). A signal event 502 can occur while system 100 is in forward mode. Signal event 502 can be an assertion of the ADPR signal. The assertion of the ADPR signal (block 404: YES) can cause controller 112 to anticipate an adapter removal (or removal of power supply 104). The assertion of the ADPR signal can cause controller 112 to determine VOTG and configure the reverse mode (blocks 406, 408 in FIG. 4). When the configuration of reverse mode is completed, controller 112 can force the ACOK signal low (e.g., de-assert) to indicate that forward mode is disabled and reverse mode is enabled (block 410), as shown by signal event 504. Referring to FIG. 5, when ACOK signal is de-asserted, the IFWD current falls to zero, due to the battery charging being disabled, and the IADP current is reduced, as IADP is only supporting ILOAD. Also, when ACOK signal is de-asserted, VBUS can rise slightly as shown by a signal event 506 due to the reduced load caused by the cessation of switching (battery charging). By way of example, if supply voltage is 48V and VOTG is 44V, a threshold for over voltage protection in reverse mode can be set to +/−2V to prevent VBUS from exceeding 46V if system 100 is under OTG or reverse mode. When over voltage protection is disabled, the supply voltage 48V can continue to support VBUS without triggering over voltage protection that can prevent operation of reverse mode.

In one embodiment, when reverse mode is enabled, controller 112 can maintain a voltage of at least the VOTG setting at the VBUS node. An OTGPG (OTG Power Good) signal can indicate that OTG mode or reverse is enabled and the voltage is within the allowed regulation window. With over voltage protection disabled, there is no upper limit to the regulation window, hence OTGPG can indicate that reverse mode is enabled and ready. Once power supply 104 is disconnected, at event 510, the VBUS voltage falls to 44V, at which point controller 112 can switch Q1, Q2, Q3, Q4 to maintain VBUS at 44V. In one embodiment, system 100 can include a voltage sense circuit configured to sense the reverse voltage and controller 112 can use the output from the voltage sense circuit to determine whether the reverse voltage has reached the determined VOTG.

In the example shown in FIG. 5, power supply 104 can be removed within the predetermined amount of time T. When power supply 104 is removed, VBUS can drop as shown by signal event 510. Since reverse mode is ready prior to the removal (e.g., see signal event 508), once power supply 104 is removed, controller 112 can operate system 100 in reverse or OTG mode and VBUS can drop to VOTG instead of drop to zero. By way of example, between signal events 504, 506 and signal event 508, VBUS can be at 48V since VBUS is supported by power supply 104. If VOTG is determined to be 44V, after signal event 508, VBUS can be reduced to 44V. Further, when reverse mode is enabled, controller 112, or another component outside of controller 112, can de-assert the ADPR signal. Therefore, the transition from forward mode to reverse mode can be seamless and operations of load 108 can be supported without interruption.

Figure 6:
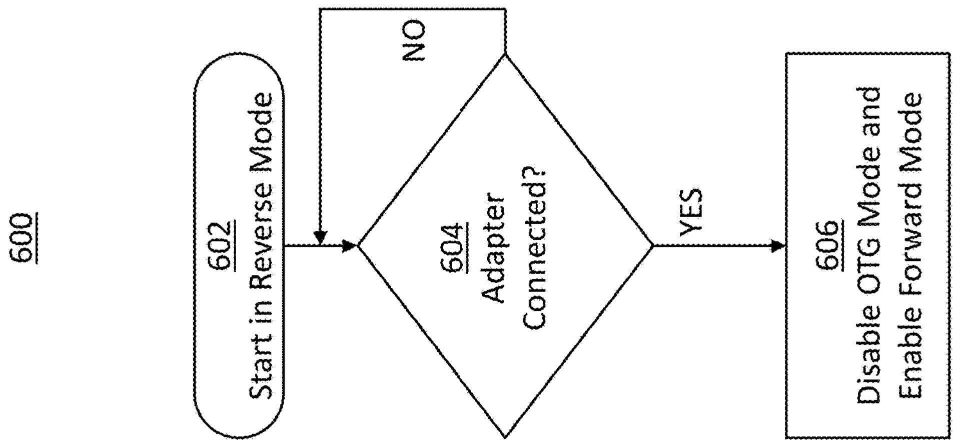
FIG. 6 is a flowchart of an example process that relates to implementation of a transition from reverse mode to forward mode in one embodiment.

FIG. 6 is a flowchart of an example process that relates to implementation of a transition from reverse mode to forward mode in one embodiment. Descriptions of FIG. 6 can reference components shown in FIG. 1 to FIG. 5. A process 600 shown in FIG. 6 can be performed by controller 112 of system 100. A starting block 602 of process 600 can occur when system 100 is operating in reverse mode or OTG mode, where VBAT supports VBUS and power supply 104 is not connected (e.g., connector 106 is opened). In one embodiment, controller 112 can perform process 600 after enabling reverse mode in block 414.

Block 604 can be performed periodically to check whether power supply 104 is inserted. Various hardware and/or software implementations can be used for monitoring specific parameters or signals related to power supply 104 in order to detect whether power supply 104 is inserted in block 604. In one embodiment, controller 112 can monitor VBUS and if VBUS increases above the VOTG under reverse mode, controller 112 can determine that power supply 104 is inserted. In another embodiment, system 100 can be a USB C-type power delivery (USB-C PD) system and there can be a query negotiated value for the voltage VBUS. Controller 112 monitors VBUS under the reverse mode, and if VBUS is at the negotiated VBUS, then controller 112 can determine that power supply 104 is inserted. In one embodiment, controller 112 can determine VOTG under reverse mode (block 406 in FIG. 4) to be lower than the negotiated VBUS such that controller 112 can use the negotiated VBUS to determine whether power supply 104 is inserted. If power supply 104 is not inserted (604: NO), process 600 can remain at block 604 to continuously determine whether power supply 104 is inserted or not. If power supply 104 is inserted (604: YES), process 600 can procced to block 606. At block 606, controller 112 can disable the reverse mode or OTG mode and enable forward mode.

In one embodiment, to ensure that VBUS does not collapse to an undesirable voltage level, such as a minimum voltage required by load 108, when transitioning from reverse mode to forward mode, controller 112 can maintain operation in reverse mode until power supply 104 is connected in block 606. In block 606, controller 112 determines configurations for the forward mode and prepares to change the switching pattern of switches Q1, Q2, Q3, Q4 to implement forward mode. When controller 112 completes configuring the forward mode, an OTG enable (OTGEN) can de-assert to disable reverse mode and enable forward mode. Controller 112 can perform process 400 after enabling forward mode in block 606.

Figure 7:
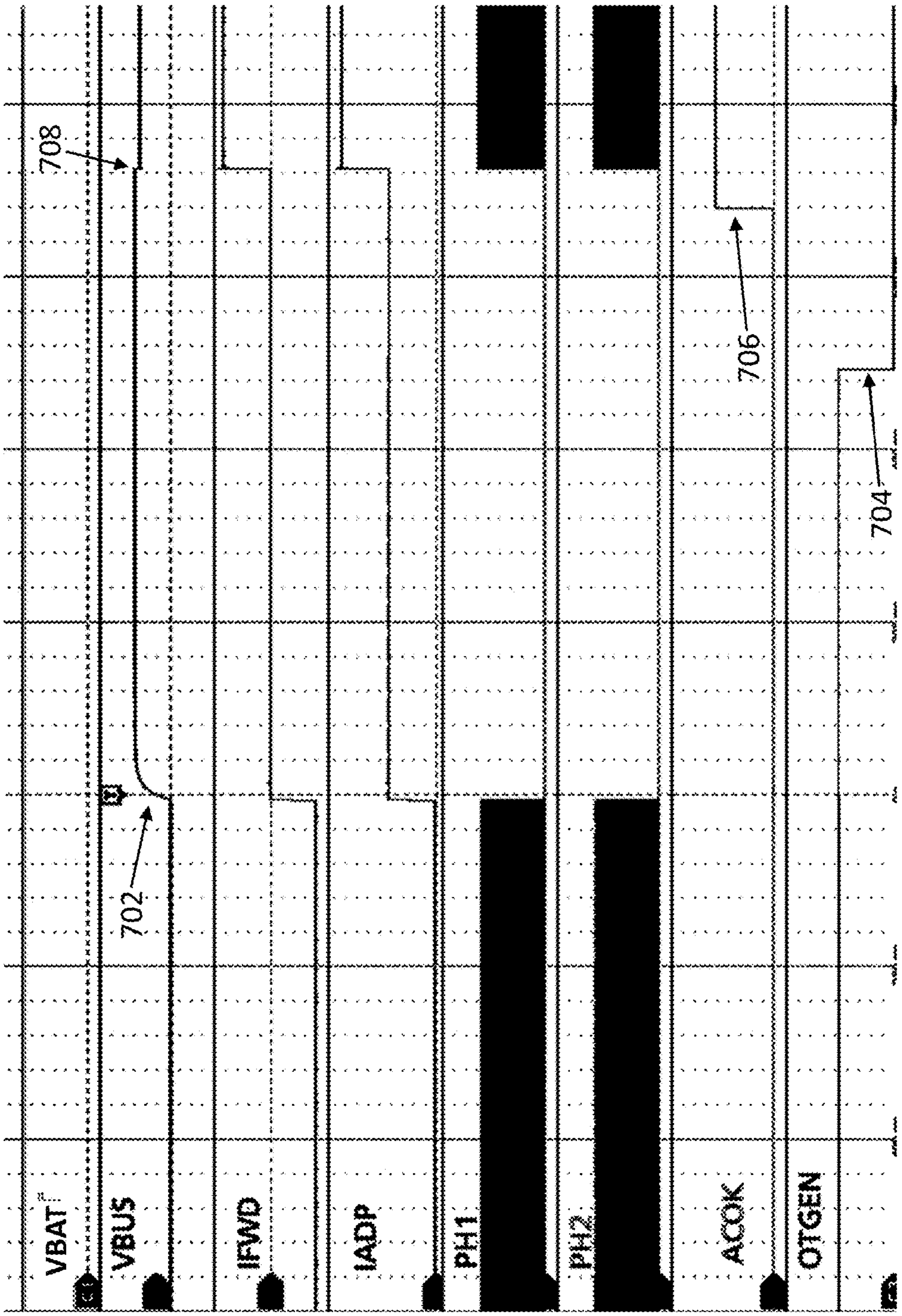
FIG. 7 is a diagram showing waveforms of signals resulting from implementation of the example process of FIG. 6 in one embodiment.

FIG. 7 is a diagram showing waveforms of signals resulting from implementation of the example process of FIG. 6 in one embodiment. Descriptions of FIG. 7 can reference components shown in FIG. 1 to FIG. 6. A plurality of signal waveforms 700 are shown in FIG. 7. Prior to a signal event 702, system 100 can be operating in reverse mode or OTG mode (e.g., block 602, 604 of process 600). Signal event 702 can be a rise in VBUS, which can indicate that power supply 104 is inserted (block 604: YES). In response to the detection that power supply is inserted, controller 112 can maintain enabling reverse mode and as shown in FIG. 7. IFWD, which supplies current from voltage regulator 110 to load 108 during reverse mode operation, stops supplying current at event 702, and IADP increases to supply load 108 and support VBUS. However, since forward mode is still disabled, IFWD will not be provided to battery 102.

Controller 112 can determine configurations for the forward mode, such as changing the switching pattern of switches Q1, Q2, Q3, Q4 to implement forward mode. When controller 112 completed configuring forward mode, an OTG enable (OTGEN) can de-assert to disable the reverse mode and enable forward mode. Further, system 100 may wait for the adapter power being provided by power supply 104 to be stable before operating in forward mode. As shown in FIG. 7, the ACOK signal asserts 706 after the OTGEN signal de-asserts 704. In response to asserting the ACOK signal, IFWD and IADP can be further increased to operate system 100 in forward mode. Also, a signal event 708 at VBUS can be slightly decreased due to power supply 104 supporting both VBUS and charging battery 102 under forward mode. Since reverse mode remained enabled for some time after power supply 104 is inserted, VBUS can be supported by IADP while controller 112 configures parameters for the forward mode and VBUS does not collapse to an undesirable voltage level, such as a minimum voltage required by load 108zero volt. Therefore, the transition from reverse mode to forward mode can be seamless and operations of load 108 can be supported without interruption.

Figure 8:
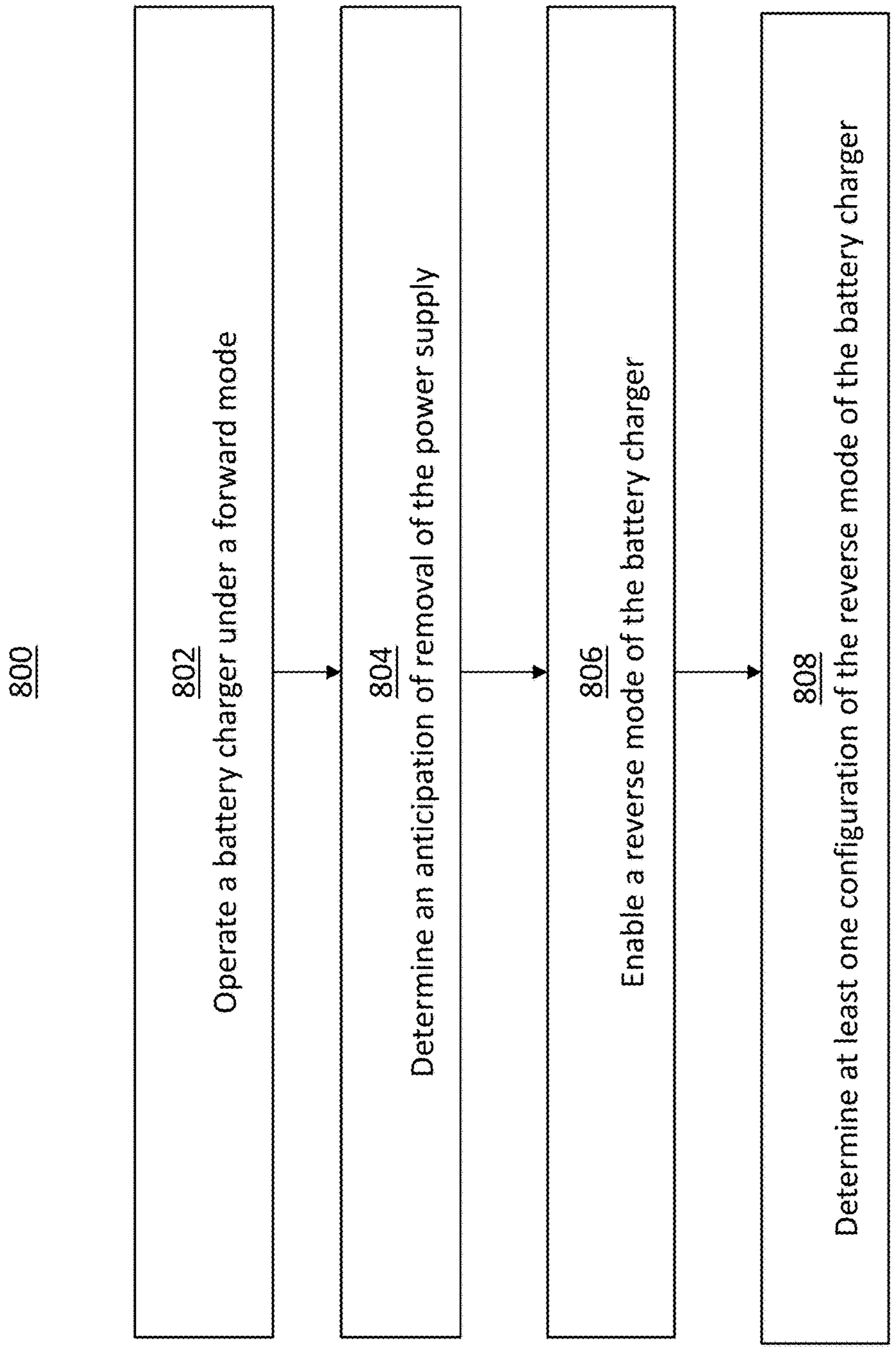
FIG. 8 is a flowchart of an example process that can implement seamless swapping of charger forward and reverse modes in one embodiment.

FIG. 8 is a flowchart of an example process that can implement seamless swapping of charger forward and reverse modes in one embodiment. Descriptions of FIG. 8 may reference components shown in FIGS. 1-7. The process 800 can include one or more operations, actions, or functions as illustrated by one or more of blocks 802, 804, 806 and/or 808. Although illustrated as discrete blocks, various blocks can be divided into additional blocks, combined into fewer blocks, eliminated, performed in different order, or performed in parallel, depending on the desired implementation.

Process 800 can be performed by a controller in a battery charging system, such as controller 112 described in the present disclosure. Process 800 can begin at block 802. At block 802, the controller can operate a battery charger under a forward mode. Under the forward mode, a power supply is connected to the battery charger to provide power to a load and to charge a battery. Process 800 can proceed from block 802 to block 804. At block 804, the controller can determine an anticipation of removal of the power supply.

Process 800 can proceed from block 804 to at least one of block 806 and block 808. At block 806, the controller can, in response to determining the anticipation, enable a reverse mode of the battery charger. When the reverse mode is enabled, the power supply remains connected to the battery charger to provide power to the load and charging of the battery is suspended. At block 808, the controller can determine at least one configuration of the reverse mode of the battery charger.

In one embodiment, the controller can determine the at least one configuration by determining a reverse voltage of the reverse mode, and the reverse voltage is less than a voltage of the power supply. In one embodiment, the controller can determine the at least one configuration by disabling an over voltage protection of the reverse mode.

In one embodiment, the controller can detect the removal (e.g., an actual removal) of the power supply when the reverse mode is enabled. In response to detecting the removal of the power supply when the reverse mode is enabled, the controller can operate the battery charger under the reverse mode using the at least one configuration to cause the battery to provide power to the load.

In one embodiment, the controller can detect an insertion of the power supply when the battery charger operates under the reverse mode. In response to detecting the insertion, the controller can maintain operation of the battery charger under the reverse mode, determine at least one configuration of the forward mode of the battery charger, disable the reverse mode, and operate the battery charger under the forward mode.

In one embodiment, in response to determining the anticipation, the controller can activate a timer to wait for a predetermined amount of time. The controller can detect the removal of the power supply within the predetermined amount of time. In response to detecting the removal of the power supply within the predetermined amount of time, the controller can operate the battery charger in the reverse mode using the at least one configuration.

In one embodiment, in response to determining the anticipation, the controller can activate a timer to wait for a predetermined amount of time. The controller can detect the power supply remains connected to the battery charger after a lapse of the predetermined amount of time. In response to detecting the power supply remains connected to the battery charger after the lapse of the predetermined amount of time, the controller can maintain operation of the battery charger in the forward mode.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLES

Example 1: A method for operating a battery charger, the method comprising: operating a battery charger under a forward mode, wherein under the forward mode, a power supply is connected to the battery charger to provide power to a load and to charge a battery; determining an anticipation of removal of the power supply; in response to determining the anticipation: enabling a reverse mode of the battery charger, wherein when the reverse mode is enabled, the power supply remains connected to the battery charger to provide power to the load and charging of the battery is suspended; and determining at least one configuration of the reverse mode of the battery charger.

Example 2: The method of Example 1, further comprising: detecting the removal of the power supply when the reverse mode is enabled; and in response to detecting the removal of the power supply when the reverse mode is enabled, operating the battery charger under the reverse mode using the at least one configuration to cause the battery to provide power to the load.

Example 3: The method of any one of Examples 1 and 2, wherein determining the at least one configuration comprises determining a reverse voltage of the reverse mode, and the reverse voltage is less than a voltage of the power supply.

Example 4: The method of any one of Examples 1 to 3, wherein determining the at least one configuration comprises disabling an over voltage protection of the reverse mode.

Example 5: The method of any one of Examples 1 to 4, further comprising: detecting an insertion of the power supply when the battery charger operates under the reverse mode; and in response to detecting the insertion: maintaining operation of the battery charger under the reverse mode; determining at least one configuration of the forward mode of the battery charger; disabling the reverse mode; and operating the battery charger under the forward mode.

Example 6: The method of any one of Examples 1 to 5, further comprising: in response to determining the anticipation, activating a timer to wait for a predetermined amount of time; detecting the removal of the power supply within the predetermined amount of time; and in response to detecting the removal of the power supply within the predetermined amount of time, operating the battery charger in the reverse mode using the at least one configuration.

Example 7: The method of any one of Examples 1 to 6, further comprising: in response to determining the anticipation, activating a timer to wait for a predetermined amount of time; detecting the power supply remains connected to the battery charger after a lapse of the predetermined amount of time; and in response to detecting the power supply remains connected to the battery charger after the lapse of the predetermined amount of time, disabling the reverse mode and operating the battery charger in the forward mode.

Example 8: An apparatus comprising: a plurality of switches; and a controller configured to: control the plurality of switches to operate a battery charger under a forward mode, wherein under the forward mode, a power supply is connected to the battery charger to provide power to a load and to charge a battery; determine an anticipation of removal of the power supply; in response to determination of the anticipation: enable a reverse mode of the battery charger, wherein when the reverse mode is enabled, the power supply remains connected to the battery charger to provide power to the load and charging of the battery is suspended; and determine at least one configuration of the reverse mode of the battery charger.

Example 9: The apparatus of Example 8, wherein the controller is configured to: detect the removal of the power supply when the reverse mode is enabled; and in response to detection of the removal of the power supply when the reverse mode is enabled, control the plurality of switches to operate the battery charger under the reverse mode using the at least one configuration to cause the battery to provide power to the load.

Example 10: The apparatus of any one of Examples 8 and 9, wherein to determine the at least one configuration, the controller is configured to determine a reverse voltage of the reverse mode, wherein the reverse voltage is less than a voltage of the power supply.

Example 11: The apparatus of any one of Examples 8 to 10, wherein to determine the at least one configuration, the controller is configured to disable an over voltage protection of the reverse mode.

Example 12: The apparatus of any one of Examples 8 to 11, wherein the controller is configured to: detect an insertion of the power supply under the reverse mode; and in response to detection of the insertion: maintain operation of the battery charger under the reverse mode; determine at least one configuration of the forward mode of the battery charger; disable the reverse mode; and operate the battery charger under the forward mode.

Example 13: The apparatus of any one of Examples 8 to 12, wherein the controller is configured to: in response to determination of the anticipation, activate a timer to wait for a predetermined amount of time; detect the removal of the power supply within the predetermined amount of time; and in response to detection of the removal of the power supply within the predetermined amount of time, operate the battery charger in the reverse mode.

Example 14: The apparatus of any one of Examples 8 to 13, wherein the controller is configured to: in response to determination of the anticipation, activate a timer to wait for a predetermined amount of time; detect the power supply remains connected to the battery charger after a lapse of the predetermined amount of time; and in response to detection that the power supply remains connected to the battery charger after the lapse of the predetermined amount of time, disable the reverse mode and operate the battery charger in the forward mode.

Example 15: A system comprising: a battery; a load; a battery charger configured to: operate in a forward mode to allow a power supply to provide power to the load and to charge the battery, wherein under the forward mode, the power supply is connected to the battery charger; determine an anticipation of removal of the power supply; in response to determination of the anticipation: enable a reverse mode of the battery charger, wherein when the reverse mode is enabled, the power supply remains connected to the battery charger to provide power to the load and charging of the battery is suspended; and determine at least one configuration of the reverse mode of the battery charger.

Example 16: The system of Example 15, wherein the battery charger is configured to: detect the removal of the power supply when the reverse mode is enabled; and in response to detection of the removal of the power supply when the reverse mode is enabled, control the plurality of switches to operate the battery charger under the reverse mode using the at least one configuration to cause the battery to provide power to the load.

Example 17: The system of any one of Examples 15 and 16, wherein to determine the at least one configuration, the battery charger is configured to determine a reverse voltage of the reverse mode, wherein the reverse voltage is less than a voltage of the power supply.

Example 18: The system of any one of Examples 15 to 17, wherein the battery charger is configured to: detect an insertion of the power supply under the reverse mode; and in response to detection of the insertion: maintain operation of the battery charger under the reverse mode; determine at least one configuration of the forward mode of the battery charger; disable the reverse mode; and operate the battery charger under the forward mode.

Example 19: The system of any one of Examples 15 to 18, wherein the battery charger is configured to: in response to determination of the anticipation, activate a timer to wait for a predetermined amount of time; detect the removal of the power supply within the predetermined amount of time; and in response to detection of the removal of the power supply within the predetermined amount of time, operate in the reverse mode.

Example 20: The system of any one of Examples 15 to 19, wherein the battery charger is configured to: in response to determination of the anticipation, activate a timer to wait for a predetermined amount of time; detect the power supply remains connected to the battery charger after a lapse of the predetermined amount of time; and in response to detection that the power supply remains connected to the battery charger after the lapse of the predetermined amount of time, disable the reverse mode and operate in the forward mode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for operating a battery charger, the method comprising:

operating the battery charger under a forward mode, wherein under the forward mode, a power supply is connected to the battery charger to provide power to a load and to charge a battery;

determining an anticipation of removal of the power supply; and in response to determining the anticipation:

enabling a reverse mode of the battery charger, prior to an operation of the battery charger in the reverse mode, by suspending charging of the battery and determining at least one configuration of a setting of the reverse mode, wherein when the reverse mode is enabled, the power supply remains connected to the battery charger to provide power to the load;

activating a timer to wait for a predetermined amount of time;

detecting whether the power supply is removed from the battery charger within the predetermined amount of time; and in response to detecting removal of the power supply from the battery charger within the predetermined amount of time, operating the battery charger in the reverse mode using the at least one configuration of the setting of the reverse mode, wherein operating the battery charger in the reverse mode causes the battery to provide power to the load.

2. The method of claim 1, wherein determining the at least one configuration of the setting of the reverse mode comprises determining a reverse voltage of the reverse mode, and the reverse voltage is less than a voltage of the power supply.

3. The method of claim 1, wherein determining the at least one configuration of the setting of the reverse mode comprises disabling, by a controller of the battery charger, an over voltage protection function of the battery charger when the battery charger is operating under reverse mode.

4. The method of claim 1, further comprising:

detecting an insertion of the power supply when the battery charger operates under the reverse mode; and in response to detecting the insertion:

maintaining operation of the battery charger under the reverse mode;

determining at least one configuration of a setting of the forward mode of the battery charger;

disabling the reverse mode; and operating the battery charger under the forward mode.

5. The method of claim 1, further comprising:

detecting the power supply remains connected to the battery charger after a lapse of the predetermined amount of time; and in response to detecting the power supply remains connected to the battery charger after the lapse of the predetermined amount of time, disabling the reverse mode and operating the battery charger in the forward mode.

6. An apparatus comprising:
a plurality of switches; and
a controller configured to:
control the plurality of switches to operate a battery charger under a forward mode, wherein under the forward mode, a power supply is connected to the battery charger to provide power to a load and to charge a battery;
determine an anticipation of removal of the power supply;
in response to determination of the anticipation:
enable a reverse mode of the battery charger, prior to an operation of the battery charger in the reverse mode, by a suspension of charging of the battery and a determination of at least one configuration of a setting of the reverse mode, wherein when the reverse mode is enabled, the power supply remains connected to the battery charger to provide power to the load;
activate a timer to wait for a predetermined amount of time;
detect whether the power supply is removed from the battery charger within the predetermined amount of time; and
in response to detection of removal of the power supply from the battery charger within the predetermined amount of time, control the plurality of switches to operate the battery charger in the reverse mode using the at least one configuration of the setting of the reverse mode, wherein operate the battery charger in the reverse mode causes the battery to provide power to the load.

7. The apparatus of claim 6, wherein to determine the at least one configuration of the setting of the reverse mode, the controller is configured to determine a reverse voltage of the reverse mode, wherein the reverse voltage is less than a voltage of the power supply.

8. The apparatus of claim 6, wherein to determine the at least one configuration of the setting of the reverse mode, the controller is configured to disable an over voltage protection of the reverse mode.

9. The apparatus of claim 6, wherein the controller is configured to:
detect an insertion of the power supply under the reverse mode; and
in response to detection of the insertion:
maintain operation of the battery charger under the reverse mode;
determine at least one configuration of a setting of the forward mode of the battery charger;
disable the reverse mode; and
operate the battery charger under the forward mode.

10. The apparatus of claim 6, wherein the controller is configured to:
detect the power supply remains connected to the battery charger after a lapse of the predetermined amount of time; and
in response to detection that the power supply remains connected to the battery charger after the lapse of the predetermined amount of time, disable the reverse mode and operate the battery charger in the forward mode.

11. A system comprising:
a battery;
a load;
a battery charger configured to
operate in a forward mode to allow a power supply to provide power to the load and to charge the battery, wherein under the forward mode, the power supply is connected to the battery charger;
determine an anticipation of removal of the power supply;
in response to determination of the anticipation:
enable a reverse mode of the battery charger, prior to an operation of the battery charger in the reverse mode, by a suspension of charging of the battery and a determination of at least one configuration of a setting of the reverse mode, wherein when the reverse mode is enabled, the power supply remains connected to the battery charger to provide power to the load;
activate a timer to wait for a predetermined amount of time;
detect whether the power supply is removed from the battery charger within the predetermined amount of time; and
in response to detection of removal of the power supply from the battery charger within the predetermined amount of time, operate the battery charger in the reverse mode using the at least one configuration of the setting of the reverse mode, wherein operate the battery charger in the reverse mode causes the battery to provide power to the load.

12. The system of claim 11, wherein to determine the at least one configuration of the setting of the reverse mode, the battery charger is configured to determine a reverse voltage of the reverse mode, wherein the reverse voltage is less than a voltage of the power supply.

13. The system of claim 11, wherein the battery charger is configured to:
detect an insertion of the power supply under the reverse mode; and
in response to detection of the insertion:
maintain operation of the battery charger under the reverse mode;
determine at least one configuration of a setting of the forward mode of the battery charger;
disable the reverse mode; and
operate the battery charger under the forward mode.

14. The system of claim 11, wherein the battery charger is configured to:
detect the power supply remains connected to the battery charger after a lapse of the predetermined amount of time; and
in response to detection that the power supply remains connected to the battery charger after the lapse of the predetermined amount of time, disable the reverse mode and operate in the forward mode.

* * * * *